United States Patent [19]
Yamamoto et al.

[11] 3,978,381
[45] Aug. 31, 1976

[54] EMERGENCY OPERATION OF A STATIC SCHERBIUS DEVICE

[75] Inventors: Shinpei Yamamoto; Takeshi Uemura, both of Kawasaki, Japan

[73] Assignee: Fuji Electric Company, Kawasaki, Japan

[22] Filed: Apr. 15, 1975

[21] Appl. No.: 568,240

[30] Foreign Application Priority Data
Apr. 23, 1974 Japan.................................. 49-46136

[52] U.S. Cl.............................. 318/197; 318/237; 317/13 R
[51] Int. Cl.² ......................................... H02P 7/36
[58] Field of Search ............... 318/197, 237; 317/13

[56] References Cited
UNITED STATES PATENTS

| | | | |
|---|---|---|---|
| 2,236,984 | 4/1941 | Alexanderson | 318/237 |
| 2,707,258 | 4/1955 | Boyer et al. | 318/197 |
| 3,136,937 | 6/1964 | Miljanic | 318/197 |
| 3,515,969 | 6/1970 | Magnuson et al. | 318/237 X |
| 3,667,012 | 5/1972 | Kilgore | 318/237 X |
| 3,683,251 | 8/1972 | Pisecker | 318/237 |

*Primary Examiner*—Gene Z. Rubinson
*Attorney, Agent, or Firm*—Sughrue, Rothwell, Mion, Zinn and Macpeak

[57] ABSTRACT

The commutating-type thyristor inverter in a static Scherbius device including a wound induction motor is protected against damage upon the occurrence of an emergency condition, in the form of a failure or reduction of the power voltage, by shifting the commutation angle of the inverter to a minimum value and reducing the inverter current to zero, and then interrupting the supply of commutating pulses to the inverter thyristors, whereby the inverter stops operating. After the emergency condition is removed, the commutating angle of the inverter is gradually increased to its normal value to restore the inverter to normal operation. If during the emergency condition the motor speed falls below a predetermined value, then the motor is accelerated through a starting resistance to a speed above this value before normal operation of the inverter is resumed.

8 Claims, 4 Drawing Figures

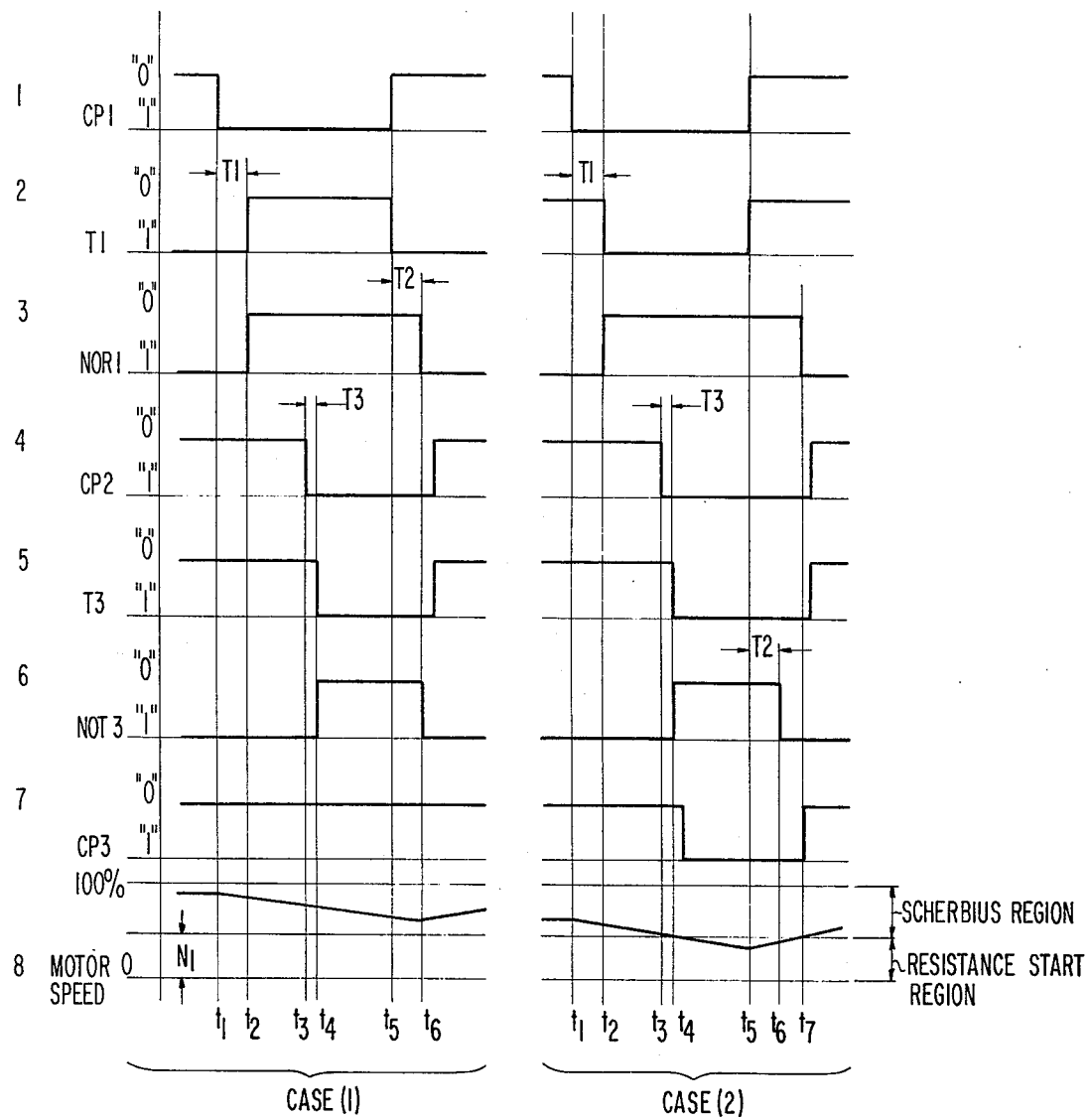

EMERGENCY OPERATION OF A STATIC SCHERBIUS DEVICE

BACKGROUND OF THE INVENTION

This invention relates to a system and method for the emergency operation of a static Scherbius device including, as indicated in FIG. 1, a wound-type induction motor 1, a converter 2 for converting the secondary a.c. power of the motor 1 into d.c. power, a d. c. reactor 3 for smoothing the d.c. output from the converter 2, and an inverter 5 for converting the d.c. power into a.c. power and regenerating it to the a.c. power source 4, which system and method are particularly useful for a short time voltage failure or a short time abnormal voltage drop of the power source.

In the above-described static Scherbius device, the rotating speed of the induction motor 1 can be controlled by varying the leading angle of the inverter 5, and the inverter 5 undergoes the commutating operation by the use of the power source a.c. voltage. For this reason, if any short-circuit trouble, grounding trouble, or change-over of power source system occurs on the power source side of the Scherbius device, a voltage drop in the range of 0 to 70% of the power source voltage, or an entire power failure, frequently results for a period ranging from serveral cycles to several minutes, and such a voltage drop or power failure can cause commutation failure in the inverter 5. The commutation failure in turn causes blowing out of the protecting fuse for the thyristors in the inverter 5, thus, not only making the Scherbius device inoperative, but also causing malfunction of the entire plant including the Scherbius device.

SUMMARY OF THE INVENTION

Therefore, a primary object of the present invention is to provide an emergency operating system and method for a static Scherbius device to guarantee safe operation of the Scherbius device against an abnormal voltage drop or power failure without requiring any additional circuit component which would tend to increase the size of the entire device to an intolerable extent.

Accordingly to the present invention, the above-mentioned object can be achieved by shifting the controlling angle of advance of the inverter to a minimum allowable value under the control of an output signal from a detector which is constantly supervising the power source voltage thereby to detect an abnormal voltage drop or power failure, and by simultaneously igniting a thyristor switch provided across the d.c. reactor. By igniting the thyristor switch, energy stored in the d.c. reactor causes a current to flow through the thyristor switch, whereby the inverter is promptly brought into a no-current state, and is protected from any damage caused by the commutation failure. Once the inverter is brought into a no-current state, the ignition pulses for the thyristors contained in the inverter can be easily blocked. The energy stored in the d.c. reactor is attenuated as described above through the thyristor switch. Thus, when the power source voltage is restored to its original value, the output signal from the detector returns to the normal state, and the inverter operates in the normal manner. The thyristor switch is then automatically extinguished by the output of a rectifier connected to the secondary side of the induction motor. As will be apparent from the above description, the induction motor can be operated without noticeable disturbance during a short-time abnormal voltage drop or power failure.

BRIEF DESCRIPTION OF THE DRAWING

FIG. 4 is a diagram for explaining the operation of FIG. 3.

DETAILED DESCRIPTION OF THE PREFERRED EMBODIMENT

Figure 1:
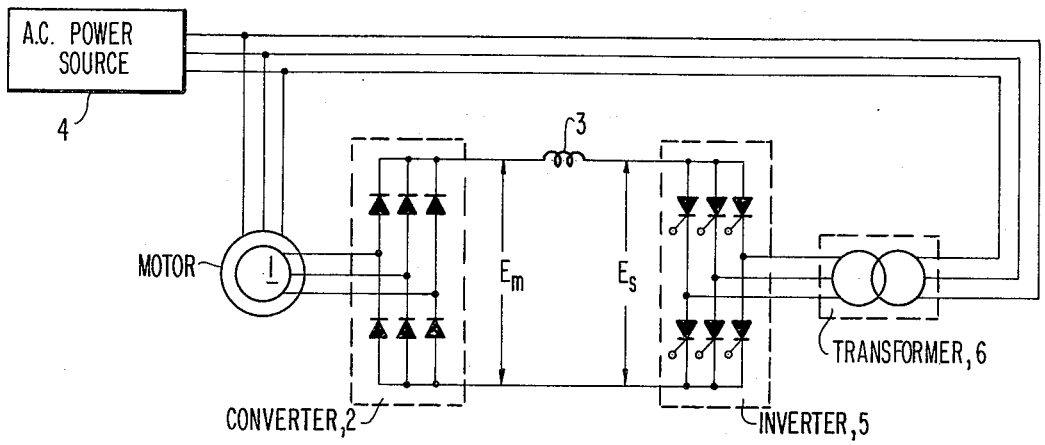
FIG. 1 is a circuit diagram showing an example of a static Scherbius device.
Figure 2:
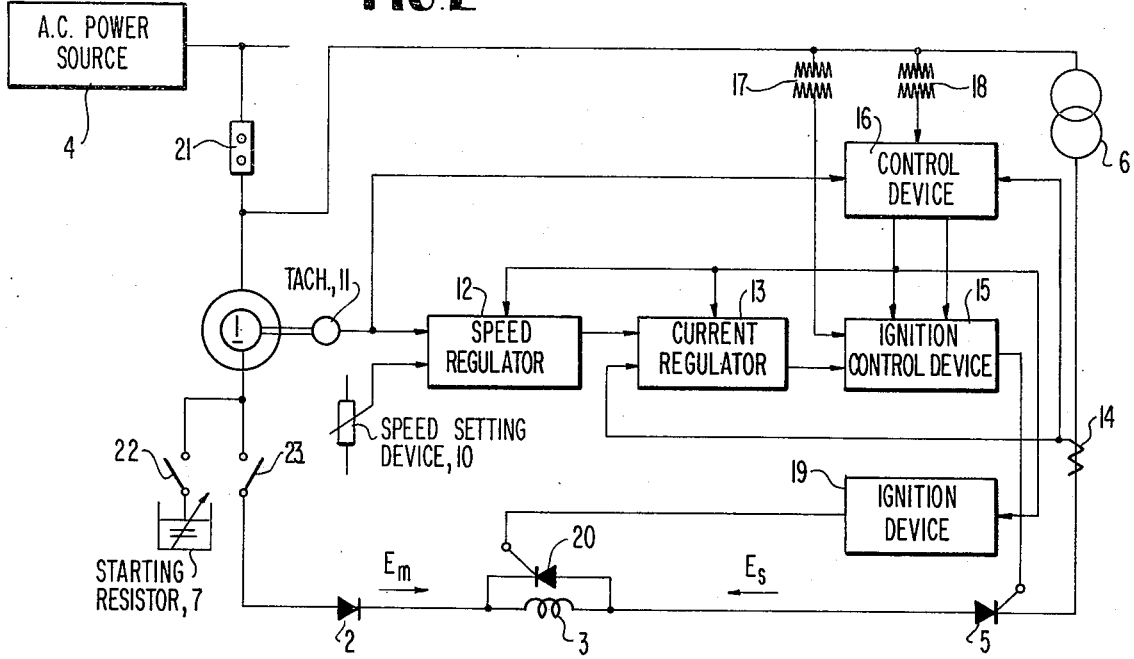
FIG. 2 is a block diagram showing an example of the present invention.

The system and method of the invention are embodied in in the preferred mode of the invention as illustrated in FIG. 2. In FIG. 2, the primary circuit of a three-phase, woundtype induction motor 1 is connected through a circuit breaker 21 to a three-phase a.c. power source 4, and the secondary circuit of the same induction motor 1 is connected through a switch 22 to a starting resistor 7. After the completion of the starting, another switch 23 is closed and the switch 22 is opened. The secondary a.c. voltage of the induction motor 1 is then converted by converter 2 into a d.c. voltage. The d.c. output terminal of the converter 2 is connected through a d.c. reactor 3 to the input terminal of a thyristor type inverter 5. The output terminal of the inverter 5 is connected through a transformer 6 to the power source 4 connected to the primary circuit of the induction motor 1 as described above. The output voltage of the converter 2 is assumed to be Em, and the input voltage of the inverter 5 is assumed to be Es. In the case when an angle of advance $\gamma$ for controlling the inverter 5 is varied, the d.c. input voltage Es of the inverter 5 also varies, and the induction motor 1 is operated in a state delivering an a.c. voltage corresponding to the input voltage Es.

In order to regulate the motor speed to a desired value, there is provided a speed regulator 12 receiving a speed-target value from a speed setting device 10 and an actual speed value from a tachometer generator 11. The motor speed regulator 12 thus forms a current-target value, corresponding to the deviation between the speed-target value and the actual value of the speed of the motor, which is delivered to a current regulator 13. The current regulator 13 thus delivers an output signal corresponding to the deviation between the current-target value and an actual value of the current detected by a current transformer 14, and the output signal is applied to an ignition control device 15. The ignition control device 15 receives through a transformer 17 a power source voltage as a synchronizing signal, and delivers an ignition pulse with an angle of advance corresponding to the output signal from the current regulator 13 thereby to control the thyristors in the inverter 5.

According to the present invention, there are further provided a control device 16 (shown in detail in FIG. 3) and a thyristor switch 20, the latter being connected in parallel with the d.c. reactor 3. The control device 16, which detects the power failure of abnormal voltage drop in the power source and operates to control the inverter 5 and the thyristor switch 20, receives firstly a voltage proportional to the power source voltage from a transformer 18 and discriminates whether the voltage is normal or not. The secondary winding of the transformer 18 is made, for instance, into six phases, and the six-phase voltages delivered therefrom are rectified in the forward stage of the control device 16 in a full-wave rectification. The d.c. voltage thus obtained is compared in a comparator stage of the control device 16 with a predetermined value. The control device 16 further operates in a manner such that, when the d.c. voltage is lower than the predetermined value for a period in excess of a predetermined duration, it detects a "power failure".

When the control device 16 detects the "power failure", it delivers an output signal to the ignition control device 15 and an ignition device 19 for the thyristor switch 20, so that the ignition control device 15 shifts the angle of advance for controlling the inverter 5 to an allowable minimum value $\gamma_{min}$, and the ignition device 19 at the same time ignites the thyristor switch 20. As a result of the angle of advance. $\gamma$ for controlling the inverter 5 being shifted to the minimum angle $\gamma_{min}$, the input d.c. voltage Es of the inverter 5 becomes higher than the output d.c. voltage Em of the converter 2. Furthermore, the ignition of the thyristor switch 20 allows a d.c. current flowing through the d.c. reactor 3 to be circulated through the thyristor switch 20, thereby mullifying the current passing through the inverter 5. That is, the inverter 5 is promptly brought into the no-current state.

In addition, the control device 16 is constantly supervising the current flowing through the inverter 5 by means of the current transformer 14 provided on the a.c. side of the inverter 5, and when the device 16 confirms the no-current state of the inverter 5, the device 16 delivers a "pulse-off" instructing signal to the ignition control device 15. Thus, the inverter 5 stops operating without any accompanying commutation failure, and the remaining energy in the d.c. reactor 3 can be circulated through the thyristor switch 20. The power sources for the electronic control devices 12 though 16 and 19 are required to be formed as failure-proof power sources or as power sources which can be maintained at the normal voltages until the control device 16 delivers the "pulse-off" instruction signal. The control device 16 furthermore zero-holds the regulators 12 and 13 by the application thereto of the same signal which ignites the thyristor switch 20 and shifts the angle of advance $\gamma$ for the inverter 5 to the minimum value $\gamma_{min}$.

For the purpose of generating an ignition pulse at the minimum allowable angle $\gamma_{min}$, it is advantageous to provide means solely for this purpose other than the angle of advance determining device which depends on the regulator and is operable in the normal state. The reason is that the amplitude as well as the frequency of the residual voltage at the primary side of the motor at the time of power failure is varied out of the normal value according to the circumstances. Thus, in the case of a three-phase bridge type inverter, the zero-voltage passing point of a synchronized signal flowing through a thyristor Th2 leading another thyristor Th1 by a phase angle of 60° can be calculated in terms of angle of advance $\gamma$ for the thyristor Th1 to be $\gamma = 60°$, whereby the formation of an ignition pulse near the minimum allowable angle of advance of, for instance, 45°, can be easily attained by combining a phase shifter with a detecting device of the zero-voltage passing point. When such means is provided, there must be a transfer of operation at the time of a power failure from the ignition pulse formation in the normal state depending on the regulator to the ignition pulse formation in the emergency time based on the detector of the zero-voltage passing point.

The control device 16 further operates to allow automatic restoration of the Scherbius device to the normal operation at the time the power source has recovered, i.e., has been restored to its normal state. When the power source voltage introduced through the transformer 18 is higher than a predetermined value for a predetermined duration, the control device 16 judges or detects that the power source is restored to the original state. After the predetermined period required for the judgment or detection of the power restoration, the control device 16 withdraws all the instructions, that is, the "pulse-off" instruction signal, "minimum angle of advance" instruction signal, and the "zero-hold" instruction signal to the regulators 12 and 13. The inverter 5, thus controlled via the ignition control device 15 by the regulation loop including the two regulators, will have its angle of advance gradually increased from the minimum value $\gamma_{min}$, so that it is restored to its normal operation.

The control device 16 also receives an additional input signal from the techometer generator 11. The additional single is used when the duration of the power failure is considerably long and the rotating speed of the induction motor is lowered to an extent that an acceleration by the use of the starting resistor 7 is required. That is, when the control device 16 detects that the rotating speed of the induction motor is lower than a predetermined value at an instant when the power restoration is assured, the device 16 does not withdraw the $\gamma_{min}$ instruction but causes switch 22 to close, instead of switch 23. As a result, the rotating speed of the induction motor is gradually elevated, and when the speed exceeds a predetermined value, the switch 22 is opened and the switch 23 is again closed. At this time, the $\gamma_{min}$ instruction is also withdrawn. The inverter 5 is then controlled by the regulator loop including the regulators 12 and 13 as described above, and is restored to its normal operation.

Figure 3:
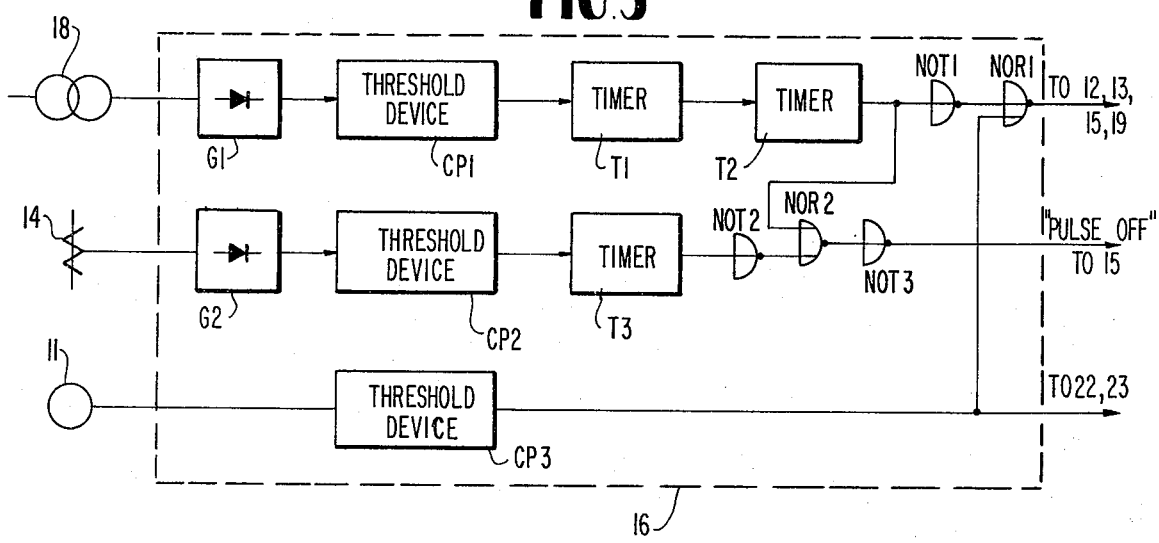
FIG. 3 is a block diagram showing an important part of the invention in a practicable manner.

A practical example of the control device 16, acting as an important part in the emergency operation according to the present invention, is shown in FIG. 3. The device 16 has three inputs, one being a voltage proportional to the power source voltage obtained through the transformer 18, the second being a voltage proportional to the current flowing through the inverter 5 obtained through the current transformer 14, and the third being a voltage proportional to the rotating speed of the induction motor obtained from the tachometer generator 11.

The input voltage obtained from the transformer 18 is rectified by a rectifier G1, introduced into a threshold device CP1, and then passed through a delayed set-instantaneous reset type timer T1, an instantaneous set-delayed reset type timer T2, a NOT circuit NOT1, and a NOR circuit NOR1 successively connected in this order. The output from the NOR1 is used as the zero-hold instruction signal for the regulators 12 and 13, the instruction signal to the ignition control device 15 for shifting the angle of advance to $\gamma_{min}$, and as the ignition instruction signal to the ignition device 19.

The input voltage from the current transformer 14 is introduced through a rectifier G2 to a threshold device CP2. The output from the threshold device CP2 is introduced through a timer T3 and a NOT circuit NOT2 to an input terminal of a NOR circuit NOR2, and the other input terminal of the NOR2 is connected to the output of the timer T2. The output of the NOR2 is passed through a NOT circuit NOT3 and is used as the pulse-off instruction signal to the ignition control device 15.

The input voltage from the tachometer generator 11 is passed through a threshold device CP3. The output from the threshold device CP3 is supplied to an input terminal of the NOR1 and also to a control device (not shown) for the switches 22 and 23 shown in FIG. 2.

FIG. 4 is a diagram to be used for the explanation of the operation of the control device shown in FIG. 3. In FIG. 4, (1) indicates the case wherein the rotating speed of the induction motor at the time of the restoration of the power source voltage is in the Schebius region, and (2) indicates the case wherein the rotating speed at the time of the restoration of the power source voltage is in a region requiring resistance-starting.

Assuming that the power source voltage drops in excess of a predetermined value at an instant $t_1$, the threshold device CP1 operates, and the output of the threshold device CP1 (represented by line 1 in FIG. 4) is changed from "0" to "1". At an instant $t_2$ after a period $T_1$ required for the confirmation of the power failure from the instant $t_1$, the timer T1 operates thereby changing the output from the timer T1 (represented by line 2 in FIG. 4) from "1" to "0". At the same instant, the timer T2 also delivers a "0" output signal which is converted into a "1" by the NOT1 and introduced into one of the input terminals of the NOR1. As a result, the NOR1 delivers a "0" instruction signal as shown by line 3 in FIG. 4 for zero-holding the regulators 12 and 13, shifting the angle of advance for controlling the inverter 5 to the predetermined minimum value $\gamma_{min}$, and for igniting the thyristor switch 20.

The inverter 5 is thus brought into the no-current state, and the output signal (represented by line 4 in FIG. 4) from the threshold device CP2 is changed to 1 at the instant $t_3$. The output signal is introduced to the timer T3 which operates at an instant $t_4$ delayed by a time period $T_3$ required for the confirmation of a no-current state of the inverter from the instant $t_3$, and its output is converted into 1 state as indicated by line 5 in FIG. 4. The output signal in the 1 state is then changed by NOT2 into 0 and introduced into one of the input terminals of the NOR2. To the other of the input terminals of the NOR2, there has been applied the output signal in the 0 state of the timer T2 since the above-described time instant $t_2$. For this reason, the output of the NOR2 is changed to the 1 state at the instant $t_4$, and this output signal in the 1 state is converted into the 0 state by the NOT3. This 0 output signal (represented by line 6 in FIG. 4) obtained from the NOT3 is applied to the ignition control device 15 as the above described "pulse-off" instruction signal. Thus, the ignition pulse from the ignition control device 15 is not applied to the inverter 5, and the operation of the inverter 5 is completely stopped.

After the operation of the inverter 5 is thus stopped, the rotation of the induction motor still continues due to inertia, but the rotating speed thereto is constantly reduced as shown by line 8 in FIG. 4. The mode of operation at the time of the restoration of the power source voltage is different between case (1) wherein the motor speed is still above a specific value N1 and in a Scherbius range, and case (2) wherein the motor speed is below the specific value N1 and in the resistance-starting range. In the first case (1), the operation of the threshold device CP1 is resumed when the power source voltage recovers in excess of a predetermined value, and the operation of the timer T1 is resumed at an instant $t_5$. However, the operation of the timer T2 is delayed until a time instant $t_6$ for a period of $T_2$ for confirming the restoration of the power source voltage, and when the timer T2 operates, the pulse-off instruction, $\gamma_{min}$ shift instruction, and the regulator zero-hold instruction are all released. Thus, the regulators 12 and 13 start to operate in accordance with the speed control deviation, and the angle of advance for controlling the inverter 5 is gradually increased from the minimum value $\gamma_{min}$ to the normal value under the control of the ignition control device 15.

In case (2), the lowering of the rotating speed of the induction motor below the specific value N1 causes the threshold device CP3 to deliver an output signal (represented by line 7 in FIG. 4) in the 1 state, whereby the switch 22 instead of the switch 23 is closed. Even though the output signal from the NOT1 is changed to 0 at the instant $t_6$, the output signal from the NOR1 is held to 0 by the output signal in the 1 state from the threshold device CP3. The inverter 5 is thus held in the no-current state by the application of the ignition pulse at the minimum angle of advance $\gamma_{min}$. However, the induction motor is accelerated by the connection of the starting resistor when the power source voltage is restored, and when the motor speed is elevated in excess of the specific value N1 at the time instant $t_7$, the output of the comparator CP3 is changed from 1 to 0 so that the output signal from the NOR1 is changed from 0 to 1. As a result, the zero-hold instruction for the regulators 12 and 13 and the $\gamma_{min}$ shifting instruction are withdrawn. The rgulators 12 and 13 now operate depending on the speed control deviation, and the ignition control device 15 delivers an ignition pulse, the angle of advance of which is gradually increased from the minimum value $\gamma_{min}$, whereby the operation of the inverter 5 returns to the normal state.

In summary, according to the present invention, commutation failure of the inverter 5 can be substantially eliminated at the time of a power source failure or abnormal voltage drop, and the inverter 5 can be safely and automatically inactivated during the power failure. When the power source voltage is reestablished, the inverter 5 is automatically returned to its normal operation.

We claim:
1. A method for the emergency operation of a static Scherbius device including a wound type induction motor connected to a power source, a converter for converting the secondary a.c. electric power of said induction motor into d.c. electric power, a d. c. reactor for smoothing the d.c. output from said converter, and a controllable commutator-type inverter for inverting the thus smoothed d.c. output into a.c. electric power to be regenerated into the power source, said method comprising detecting an emergency condition in the form of a voltage failure or an abnormal voltage drop and, in response to such detection, shifting from its normal value to a minimum value the angle of advance of the control signals for controlling the operation of the inverter.

2. A method as set forth in claim 1, further comprising closing an inductive current recirculating loop around said d.c. reactor in response to the detection of said emergency condition, thereby reducing the inverter current to zero.

3. A method as set forth in claim 2, further comprising interrupting the supply of commutation-controlling signals to the inverter when the inverter current is zero.

4. A method as set forth in claim 3, further comprising, when recovery of the power source voltage from said emergency condition is detected, resuming the supply of the control signals to the inverter, and gradually increasing the controlling angle of advance for the inverter.

5. A method as set forth in claim 3, further comprising; when the rotating speed of said induction motor is lower than a predetermined value at the time when the recovery of the power source voltage is detected, connecting the secondary of said induction motor to starting resistors, thereby to effectuate secondary-resistance starting of the motor and to accelerate the motor to said predetermined value, thereafter reconnecting the secondary side to the static Scherbius device, and then gradually increasing the controlling angle of advance to its normal value.

6. In a static Scherbius device including a wound type induction motor connected to a power source, a converter for converting the secondary a.c. electric power of said induction motor into d.c. electric power, a d. c. reactor for smoothing the d.c. output from said converter, and a controllable commutator-type inverter for inverting the thus smoothed d.c. output into a.c. electric power to be regenerated into the power source, apparatus for providing for the emergency operation of the Scherbius device during a power failure, said apparatus comprising detecting means for producing a control signal indicative of an abnormal drop in the power voltage, control means coupled to said detecting means and responsive to said control signal for reducing the firing angle of said inverter to a minimum value and for reducing the inverter current to zero, and means responsive to zero inverter current for stopping the operation of the inverter.

7. The apparatus as set forth in claim 6, further comprising a normally OFF thyristor connected in a recirculating loop around said impedance, said thyristor being turned ON by said control signal to close said loop, thereby reducing the inverter current to zero.

8. The apparatus as set forth in claim 6, wherein said inverter includes thyristors and said operation stopping means comprises means for blocking the supply of commutation signals to the thyristors in the inverter.

* * * * *